United States Patent
Kung et al.

(10) Patent No.: US 8,325,505 B2
(45) Date of Patent: *Dec. 4, 2012

(54) METHOD AND APPARATUS FOR INPUT CHARGE CONTROL OF A POWER SUPPLY

(75) Inventors: David Kung, Hillsborough, CA (US); William M. Polivka, Campbell, CA (US)

(73) Assignee: Power Integrations, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/401,674

(22) Filed: Feb. 21, 2012

(65) Prior Publication Data

US 2012/0146607 A1 Jun. 14, 2012

Related U.S. Application Data

(63) Continuation of application No. 12/477,058, filed on Jun. 2, 2009, now Pat. No. 8,139,384.

(51) Int. Cl.
*H02M 7/44* (2006.01)
(52) U.S. Cl. .................................. 363/97; 363/21.13
(58) Field of Classification Search .................. 323/285, 323/299; 363/21.13, 97
See application file for complete search history.

(56) References Cited

U.S. PATENT DOCUMENTS

| | | | |
|---|---|---|---|
| 5,124,518 A | 6/1992 | Lee | |
| 5,450,306 A | 9/1995 | Garces et al. | |
| 6,111,767 A | 8/2000 | Handleman | |
| 6,339,538 B1 | 1/2002 | Handleman | |
| 6,977,824 B1 | 12/2005 | Yang et al. | |
| 7,016,204 B2 | 3/2006 | Yang et al. | |
| 7,054,170 B2 | 5/2006 | Yang et al. | |
| 7,061,225 B2 | 6/2006 | Yang et al. | |
| 7,061,780 B2 | 6/2006 | Yang et al. | |
| 7,259,972 B2 | 8/2007 | Yang | |
| 7,352,595 B2 | 4/2008 | Yang et al. | |
| RE40,656 E | 3/2009 | Yang et al. | |

(Continued)

FOREIGN PATENT DOCUMENTS

WO  WO 02/31953 A1  4/2002

(Continued)

OTHER PUBLICATIONS

EP 10 163 150—First Office Action, mailed Sep. 24, 2010 (7 pages).

(Continued)

*Primary Examiner* — Jeffrey Sterrett
(74) *Attorney, Agent, or Firm* — Blakely Sokoloff Taylor & Zafman LLP

(57) ABSTRACT

An example power supply includes an energy transfer element, a switch and a controller. The controller includes a logic circuit and a constant current control circuit. The logic circuit generates a drive signal to control the switch in response to a control signal. The constant current control circuit generates the control signal in response to a received input current sense signal, input voltage sense signal, and output voltage sense signal. An integrator included in the constant current control circuit integrates the input current sense signal to generate an integrated signal representative of a charge taken from the input voltage source. The constant current control circuit is adapted to generate the control signal to provide a constant current at the output of the power supply such that the integrated signal is proportional to a ratio of the output voltage sense signal to the input voltage sense signal.

20 Claims, 12 Drawing Sheets

U.S. PATENT DOCUMENTS

| | | |
|---|---|---|
| 7,688,608 B2 | 3/2010 | Oettinger et al. |
| 7,787,263 B2 | 8/2010 | Oettinger et al. |
| 7,965,151 B2 | 6/2011 | Liu et al. |
| 8,139,384 B2 * | 3/2012 | Kung et al. ............... 363/97 |
| 2002/0044468 A1 | 4/2002 | Goodarzi et al. |
| 2006/0203524 A1 | 9/2006 | Ohno et al. |
| 2008/0192514 A1 | 8/2008 | Zhou et al. |
| 2008/0309303 A1 | 12/2008 | Morota et al. |
| 2010/0157634 A1 | 6/2010 | Yu et al. |
| 2010/0301821 A1 | 12/2010 | Kung et al. |
| 2010/0301959 A1 | 12/2010 | Liu et al. |
| 2010/0302811 A1 | 12/2010 | Saint-Pierre |

FOREIGN PATENT DOCUMENTS

| | | |
|---|---|---|
| WO | WO 2005/043732 A1 | 5/2005 |

OTHER PUBLICATIONS

EP 10 163 150—Search Report, dated Sep. 1, 2010 (3 pages).

"MC3337X Hochspannungs-Schaltregler Fuer Einfache Netzteile," Elektronik, Weka Fachzeitschriftenverlag, Poing, DE, vol. 47, No. 22, Oct. 27, 1998, p. 18, ISSN: 0013-5658.

* cited by examiner

US 8,325,505 B2

METHOD AND APPARATUS FOR INPUT CHARGE CONTROL OF A POWER SUPPLY

REFERENCE TO PRIOR APPLICATIONS

This application is a continuation of U.S. application Ser. No. 12/477,058, filed Jun. 2, 2009, entitled "Method and Apparatus for Input Charge Control of a Power Supply." U.S. application Ser. No. 12/477,058 is hereby incorporated by reference.

BACKGROUND INFORMATION

1. Field of the Disclosure

The present invention relates generally to power supplies, and more specifically, the invention relates to control circuits to regulate an output of a power supply by measuring a quantity of charge received from the power supply input.

2. Background

In a typical switched-mode power supply application, the ac-dc power supply receives an input that is between 100 and 240 volts rms from an ordinary ac electrical outlet. Switches in the power supply are switched on and off by a control circuit to provide a regulated output that may be suitable for operating an electronic device, or for charging a battery that provides power to an electronic device. The regulated output is typically a dc voltage less than 10 volts dc. Furthermore, the current from the output is usually regulated when the power supply is charging a battery.

Safety agencies generally require the power supply to provide galvanic isolation between the input and the output of the power supply. Galvanic isolation prevents dc current from flowing between the input and the output of the power supply. In other words, a high dc voltage applied between an input terminal and an output terminal of the power supply will produce no dc current between the input terminal and the output terminal of the power supply. The requirement for galvanic isolation is a complication that contributes to the cost of the power supply.

A power supply with galvanic isolation must maintain an isolation barrier that electrically separates the input from the output. Energy must be transferred across the isolation barrier to provide power to the output, and information in the form of feedback signals in many cases is transferred across the isolation barrier to regulate the output. Galvanic isolation is typically achieved with electromagnetic and electro-optical devices. Electromagnetic devices such as transformers and coupled inductors are generally used to transfer energy between input and output to provide output power, whereas electro-optical devices are generally used to transfer signals between output and input to control the transfer of energy between input and output.

Efforts to reduce the cost of the power supply have focused on the elimination of electro-optical devices and their associated circuits. Alternative solutions generally use a single energy transfer element such as, for example, a transformer or, for example, a coupled inductor to provide energy to the output and also to obtain the information necessary to control the output. The lowest cost configuration typically places the control circuit and a high voltage switch on the input side of the isolation barrier. The controller obtains information about the output indirectly from observation of a voltage at a winding of the energy transfer element. The winding that provides the information is also on the input side of the isolation barrier. To reduce cost and complexity further, the controller can also use the same winding of the energy transfer element to obtain information about the input to the power supply to control an output of the power supply.

The input side of the isolation barrier is sometimes referred to as the primary side, and the output side of the isolation barrier is sometimes referred to as the secondary side. Windings of the energy transfer element that are not galvanically isolated from the primary side are also primary side windings, sometimes called primary referenced windings. A winding on the primary side that is coupled to an input voltage and receives energy from the input voltage is sometimes referred to simply as the primary winding. Other primary referenced windings that deliver energy to circuits on the primary side may have names that describe their principal function, such as for example a bias winding, or for example a sense winding. Windings that are galvanically isolated from the primary side windings are secondary side windings, sometimes called output windings.

While it is quite straightforward to use a winding on the input side of the isolation barrier to obtain information indirectly about a galvanically isolated output voltage, it is a different challenge to obtain information indirectly about a galvanically isolated output current. In many power supply topologies, the measurement of a current in an input winding alone is not sufficient to determine an output current. Conventional solutions for measuring an output current usually include a current to voltage conversion that wastes power and uses costly components to transmit a signal across the isolation barrier.

BRIEF DESCRIPTION OF THE DRAWINGS

Non-limiting and non-exhaustive embodiments and examples of the present invention are described with reference to the following figures, wherein like reference numerals refer to like parts throughout the various views unless otherwise specified.

DETAILED DESCRIPTION

Methods and apparatuses for enabling a power supply to provide a galvanically isolated output that has a region of regulated voltage and a region of regulated current are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

Figure 1:
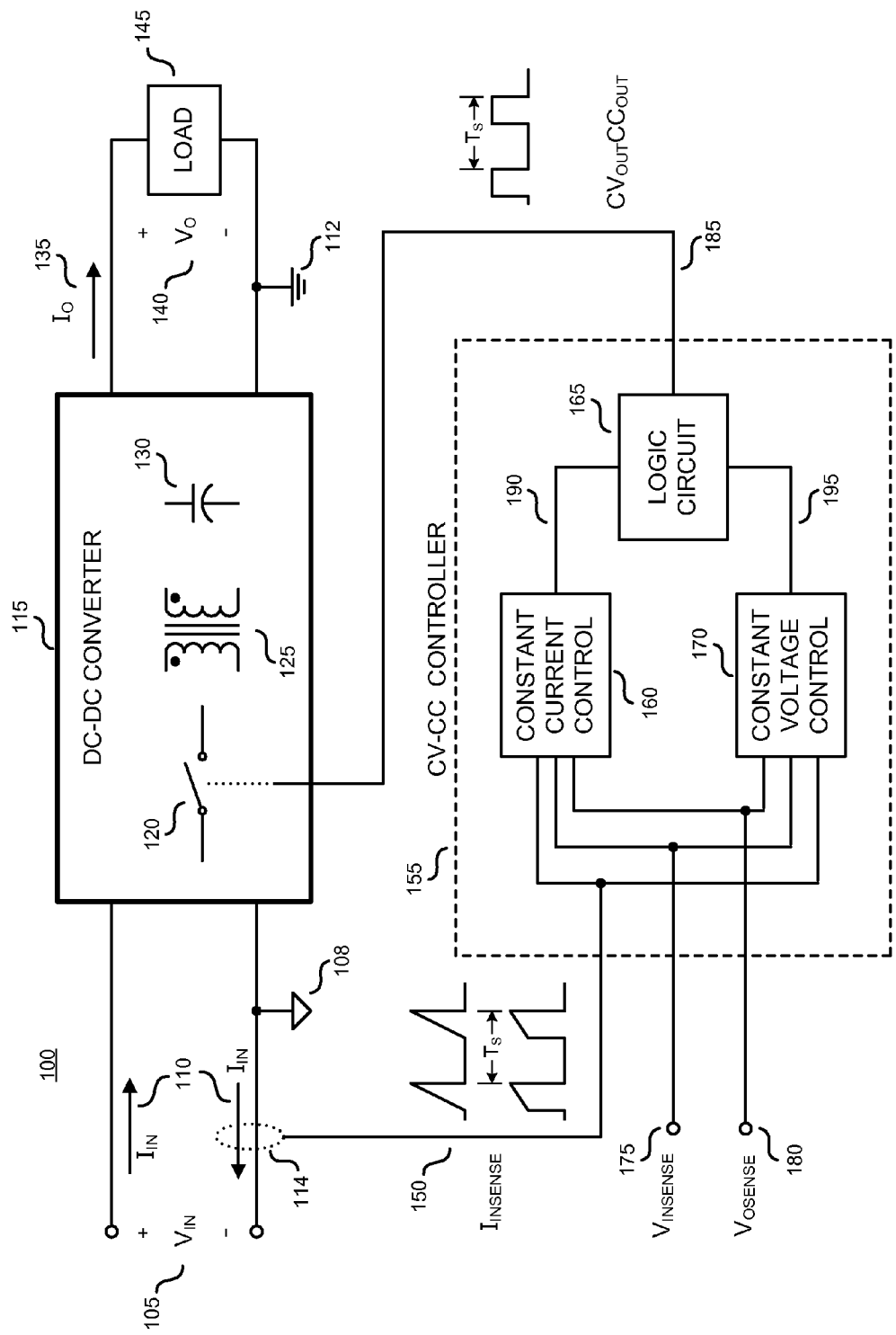
FIG. 1 is a functional block diagram illustrating a dc-dc power supply including a constant-voltage constant-current controller that controls an output of the power supply in a regulated voltage region and in a regulated current region, in accordance with the teachings of the present invention.

The functional block diagram of FIG. 1 shows one example of a dc-dc power supply 100 that receives an input voltage $V_{IN}$ 105 to produce an output voltage $V_O$ 140 and an output current $I_O$ 135 at a load 145. In one example power supply 100 is an ac-dc power supply, where dc input voltage $V_{IN}$ 105 is a rectified and filtered ac input voltage received from an input voltage source (not shown). Input voltage $V_{IN}$ 105 is positive with respect to an input return 108. Output voltage $V_O$ 140 is positive with respect to an output return 112.

The dc-dc power supply 100 in the example of FIG. 1 includes a dc-dc converter 115 that is controlled by a controller 155 to regulate the output voltage $V_O$ 140 and the output current $I_O$ 135. The controller 155 may be called a CV-CC controller because it may be utilized to control an output of the dc-dc converter 115 to have a constant voltage (CV) region and a constant current (CC) region. The dc-dc converter 115 typically includes at least one switch 120, at least one coupled inductor 125, and at least one capacitor 130. All standard converter configurations used to provide galvanically isolated outputs, such as for example the flyback converter and for example the many variants of the buck converter may be realized by an arrangement of switches, coupled inductors, and capacitors represented by the dc-dc converter block 115 in the example of FIG. 1.

In the example of FIG. 1, CV-CC controller 155 receives an $I_{INSENSE}$ signal 150 that is representative of the input current $I_{IN}$ 110, a $V_{INSENSE}$ signal 175 that is representative of the input voltage $V_{IN}$ 105, and a $V_{OSENSE}$ signal 180 that is representative of the output voltage $V_O$ 140. In the example of FIG. 1, a switch 120 included in dc-dc converter 115 is responsive to a $CV_{OUT}CC_{OUT}$ signal 185 received from CV-CC controller 155. In the example of FIG. 1, $CV_{OUT}CC_{OUT}$ 185 is a logic signal that may be high or low within a switching period $T_S$. In one example, a switch 120 is closed when $CV_{OUT}CC_{OUT}$ 185 is high, and the switch 120 is open when $CV_{OUT}CC_{OUT}$ 185 is low. A closed switch is sometimes referred to as being in an on state. An open switched is sometimes referred to as being in an off state. In other words, a switch that turns on closes, and a switch that turns off opens.

In one example, switch 120 is a metal oxide semiconductor field effect transistor (MOSFET). In another example, CV-CC controller 155 may be implemented as a monolithic integrated circuit or may be implemented with discrete electrical components or a combination of discrete and integrated components. CV-CC controller 155 and switch 120 could form part of an integrated circuit that is manufactured as either a hybrid or a monolithic integrated circuit. A current sensor that produces $I_{INSENSE}$ signal 150 may also form part of the integrated circuit.

In the example of FIG. 1, the input current $I_{IN}$ 110 is a pulsating current that is substantially zero when $CV_{OUT}CC_{OUT}$ signal 185 is low. The waveform of the input current $I_{IN}$ 110 may exhibit two distinct shapes. Each shape corresponds to a different mode of operation of the dc-dc converter 115. When the input current has a triangular shape with a magnitude that is zero immediately after switch 120 closes, the dc-dc converter 115 is operating in discontinuous conduction mode (DCM). When the input current has a trapezoidal shape with a magnitude that is not zero immediately after switch 120 closes, the dc-dc converter 115 is operating in continuous conduction mode (CCM). The mode of operation depends on the input voltage $V_{IN}$ 105, the output voltage $V_O$ 140, the load 145, and the particular design of the converter. For example, the mode of operation typically changes from CCM to DCM as the input voltage $V_{IN}$ 105 increases, and it typically changes from DCM to CCM as the load increases. It is appreciated that dc-dc converter 115 may be designed to operate in only CCM or in only DCM within a restricted range of input voltage and load. Examples, in accordance with the present invention, allow a single design to provide the desired regulation of output voltage and output current for DCM and CCM operation.

The CV-CC controller 155 in the example of FIG. 1 includes a constant current control circuit 160, a constant voltage control circuit 170, and a logic circuit 165. In the example of FIG. 1, the constant current control circuit 160 and the constant voltage control circuit 170 receive the input current sense signal $I_{INSENSE}$ 150, the input voltage sense signal $V_{INSENSE}$ 175, and the output voltage sense signal $V_{OSENSE}$ 180.

It is appreciated that input voltage sense signal $V_{INSENSE}$ 175 and output voltage sense signal $V_{OSENSE}$ 180 may be any signals that have a known relationship to the input voltage $V_{IN}$ 105 and the output voltage $V_O$ 140 respectively. In other words, it is not necessary to sense the input voltage directly or the output voltage directly to obtain the respective signals $V_{INSENSE}$ 175 and $V_{OSENSE}$ 180. For example, current in an inductor changes at a rate that is directly proportional to the voltage across the inductor. Therefore, in one example the signal $V_{INSENSE}$ 175 may be a timing signal that is high while current in an inductor is greater than a first value while being less than a second value. In one example, $V_{INSENSE}$ 175 may represent the amount of time that it takes current in the inductor to change from the first value to the second value. In one example, $V_{INSENSE}$ 175 may represent the average value of a digital signal, where the digital signal is high during the time that it takes the current in an inductor to change from the first value to the second value so that a value of input voltage $V_{IN}$ 105 can be derived.

Constant current control circuit 160 produces a control signal 190 to operate dc-dc converter 115 in the regulated output current region. Constant voltage control circuit 170 produces a control signal 195 to operate dc-dc converter 115 in the regulated output voltage region. Logic circuit 165 responds to control signals 195 and 190 to produce an appropriate $CV_{OUT}CC_{OUT}$ signal 185 to control the switch 120 in dc-dc converter 115 for a regulated voltage region and a regulated current region as illustrated by the graph in FIG. 2.

Figure 2:
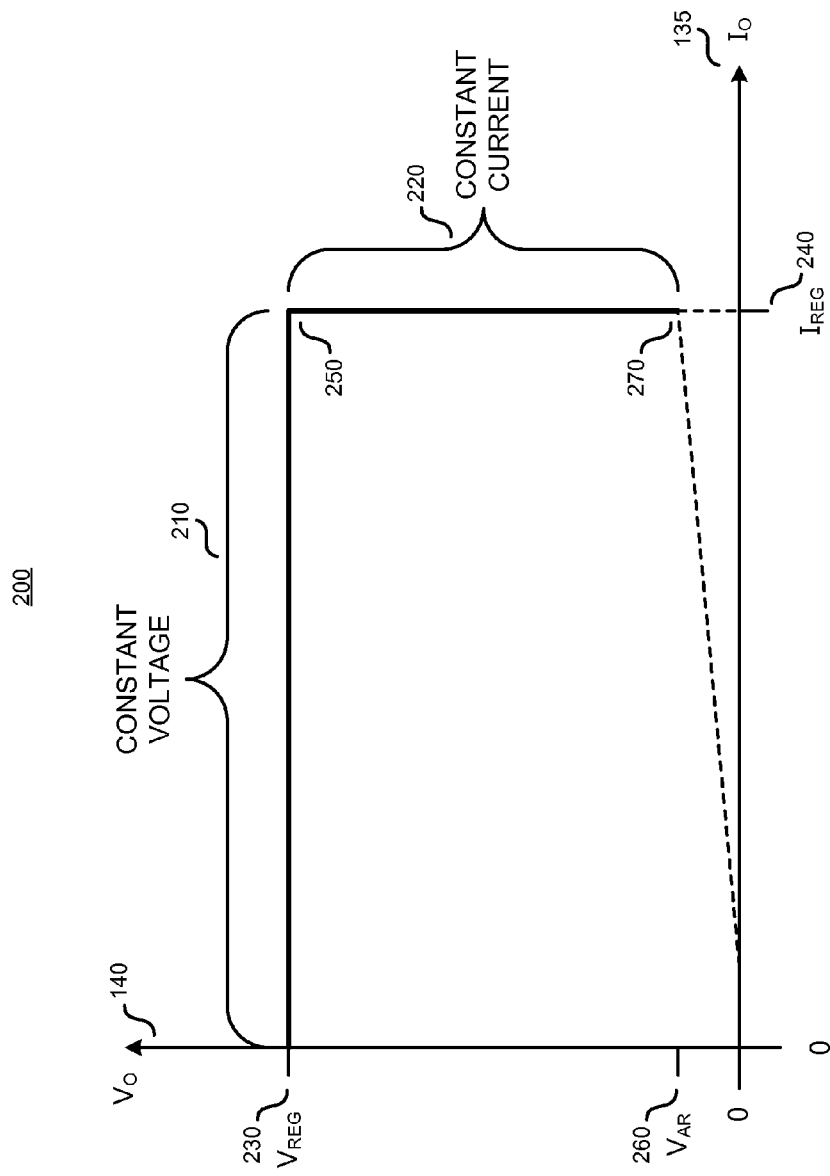
FIG. 2 is a graph illustrating an output characteristic of a power supply as including a region of regulated voltage and a region of regulated current, in accordance with the teachings of the present invention.

FIG. 2 is an example graph of an output characteristic 200 of a power supply that has a region of regulated output voltage 210 and a region of regulated output current 220. Output characteristic 200 is one possible output characteristic of power supply 100 of FIG. 1. The example shows that the output voltage $V_O$ 140 is a substantially constant regulated value $V_{REG}$ 230 when the output current $I_O$ 135 is less than a threshold current that in one example may be a regulated value $I_{REG}$ 240. The example also shows that the output current $I_O$ 135 is a substantially constant regulated value $I_{REG}$ 240 when the output voltage $V_O$ 140 is less than a threshold voltage value and greater than an optional auto-restart voltage $V_{AR}$ 260. In one example the threshold voltage value may be the regulated value $V_{REG}$ 230.

In some examples, it is not desirable to extend the regulated current region 220 to an output voltage of zero volts. For example, power supplies that charge batteries do not normally have an output voltage of zero volts, since even a fully discharged battery exhibits a minimum voltage when it is charging. Therefore, output voltage less than a minimum value indicates a failure of the battery, and the power supply typically is required to deliver substantially less than the regulated current under such circumstances.

In other examples, limitations of practical circuits may prevent a power supply from regulating current within specified limits when the output voltage is at zero volts. Therefore, a power supply may enter an auto-restart mode when the output voltage is below a minimum value to guarantee that the average output current does not exceed a maximum desired value. When operating in an auto-restart mode, a power supply will typically deliver its maximum output current for a time that is long enough to raise the output voltage above the auto-restart value $V_{AR}$ 260 under normal circumstances. If the output voltage is not above the auto-restart value $V_{AR}$ 260 after an allotted time, then the power supply typically will deliver no output current for a substantially long time that may be hundreds or thousands of switching periods before repeating the delivery of maximum output current.

The characteristic of the load 145 determines where the power supply will operate on the graph of the output characteristic 200. When the load 145 demands a low current that is substantially less than the value $I_{REG}$ 240, the output will be a regulated voltage with value $V_{REG}$ 230. Under this condition, logic circuit 165 selects control signal 195 from constant voltage control circuit 170 to control the switch 120 of the dc-dc converter 115. As the load 145 takes more current at the regulated voltage $V_{REG}$, the power from the output will increase until the power reaches the design limit of the dc-dc converter 115. The design limit of the dc-dc converter 115 corresponds to a maximum output power 250. As the load demands more current than $I_{REG}$ 240, the output voltage $V_O$ 140 falls below the regulated value $V_{REG}$ 230. Logic circuit 165 detects the response of constant voltage control circuit 170 to the reduction in output voltage $V_O$ 230, and selects the control signal 190 from constant current control circuit 160 to regulate the output current $I_O$ 135 to the value $I_{REG}$ 240 until the output voltage falls to the auto-restart value $V_{AR}$ 260 at the point 270 on the graph.

When the output current $I_O$ 135 delivered to load 145 is less than the value $I_{REG}$ 240, and output voltage $V_O$ is greater than the auto-restart value $V_{AR}$ 260, output voltage $V_O$ 140 increases until it reaches the regulated value $V_{REG}$ 230. As the load current decreases further, logic circuit 165 detects the response of constant voltage control circuit 170 to the increase in output voltage $V_O$ 230, and selects the control signal 195 from constant voltage control circuit 170 to regulate the output voltage $V_O$ 140 to the value $V_{REG}$ 230.

The constant voltage control circuit 170 in the example power supply 100 of FIG. 1 may use any of several techniques known in the art for regulation of the output voltage of a power supply. Examples of these techniques include pulse width modulation (PWM) with constant switching frequency, PWM with variable switching frequency, pulse frequency modulation (PFM) with fixed pulse width, and on/off control. Pulse width modulation is a technique that changes the length of time a switch conducts during a switching period. The switching period may be either constant or variable. When the switching period is constant, both the length of time the switch conducts and the length of time the switch does not conduct must change. When the switching period is variable, the length of time the switch conducts and the length of time the switch does not conduct may change independently. Pulse frequency modulation is a technique that changes the length of time the switch is off while maintaining the on-time substantially constant. On/off control is a technique that either allows a switch to conduct or prevents a switch from conducting during a switching period, producing a sequence of regular switching periods where the switch conducts in some switching periods and the switch does not conduct in other switching periods. Thus, examples of the present invention may be used with many different techniques to regulate output voltage.

Examples of the invention described in this disclosure may also use many techniques to sense the input current $I_{IN}$ 110 as the current sense signal $I_{INSENSE}$ 150. Current sensor symbol 114 in FIG. 1 may represent any of the many known ways to sense current. For example, the input current may be sensed as a voltage on a discrete resistor, or as a current from a current transformer, or as a voltage across the on-resistance of a metal oxide semiconductor field effect transistor (MOSFET) when the input current is the same as the current in the transistor, or as a current from the sense output of a current sensing field effect transistor (senseFET).

Although it is beneficial to sense the output voltage $V_O$ 140 indirectly as a voltage with respect to the input return 108, the output voltage sense signal $V_{OSENSE}$ 180 may be obtained directly from a measurement of the output voltage $V_O$ 140 with respect to the output return 112 in examples where galvanic isolation is not required, or in examples where the cost of electro-optical isolation is acceptable. It is appreciated that direct sensing of the output voltage $V_O$ 140 typically will provide a smaller deviation from the desired value $V_{REG}$ 230 in the region of constant output voltage 210 than can be achieved with indirect sensing. The output voltage sense signal $V_{OSENSE}$ 180 may be obtained by either indirect or direct sensing methods.

Examples of the present invention provide an output with a regulated current region 220 in the absence of a direct measurement of the output current $I_O$ 135. This is accomplished by making use of the mathematical relationship between various signal values as explained below:

For a lossless power converter, the average input power is identical to the average output power. The power balance within a switching period $T_S$ may be written as $$\frac{1}{T_S}\int_0^{T_S} V_{IN} I_{IN} dt = \frac{1}{T_S}\int_0^{T_S} V_O I_O dt \qquad \text{EQ. 1}$$

For a dc-dc converter such as the example of FIG. 1 where the only quantity that substantially changes with time during a switching period is the input current $I_{IN}$ 110, Equation (1) simplifies to $$V_{IN}\int_0^{T_S} I_{IN} dt = V_O I_O T_S \qquad \text{EQ. 2}$$

The integral in Equation (2) represents the total electric charge Q taken from the input voltage source (and received by the dc-dc converter) over the switching period $T_S$.

$$V_{IN} Q = V_O I_O T_S \qquad \text{EQ. 3}$$

Therefore, the output current may be written in terms of the other quantities as $$I_O = \frac{V_{IN} Q}{V_O T_S} \qquad \text{EQ. 4}$$

To keep the output current $I_O$ at a desired value $I_{REG}$, the electric charge Q in Equation (4) is controlled such that $$Q = \frac{V_O I_{REG} T_S}{V_{IN}} \qquad \text{EQ. 5}$$

Equation (5) shows that the electric charge taken from the source of input voltage 105 during each switching period is directly proportional to the output voltage $V_O$ and inversely proportional to the input voltage $V_{IN}$. The charge relationship of Equation (5) may be converted to a voltage relationship by dividing both sides of Equation (5) by a capacitance C.

$$V_Q = \frac{Q}{C} = \left(\frac{V_O}{V_{IN}}\right)\frac{I_{REG} T_S}{C} \qquad \text{EQ. 6}$$

The charge Q may be determined from either integration of the input current $I_{IN}$ 110 or integration of the current sense signal $I_{INSENSE}$ 150. Similarly, the right hand side of Equation (6) may be presented in terms of the sensed quantities $V_{OSENSE}$ and $V_{INSENSE}$, with the scaling factors being accounted for in a scaling voltage $V_K$, where $V_K$ is given in Equation (8) below. Therefore, we can write the requirement for a constant output current as $$V_Q = \frac{1}{C}\int_0^{T_S} I_{INSENSE} dt = \frac{V_{OSENSE}}{V_{INSENSE}} V_K \qquad \text{EQ. 7}$$

where $V_Q$ is the integrated signal that represents the electric charge received by the dc-dc converter within a switching period $T_S$ and $V_K$ is a scaling voltage. The scaling voltage $V_K$ is determined by the sensing ratios and other known quantities as $$V_K = \left(\frac{V_O}{V_{OSENSE}}\right)\left(\frac{V_{INSENSE}}{V_{IN}}\right)\left(\frac{I_{INSENSE}}{I_{IN}}\right)\left(\frac{I_{REG} T_S}{C}\right) \qquad \text{EQ. 8}$$

Figure 3:
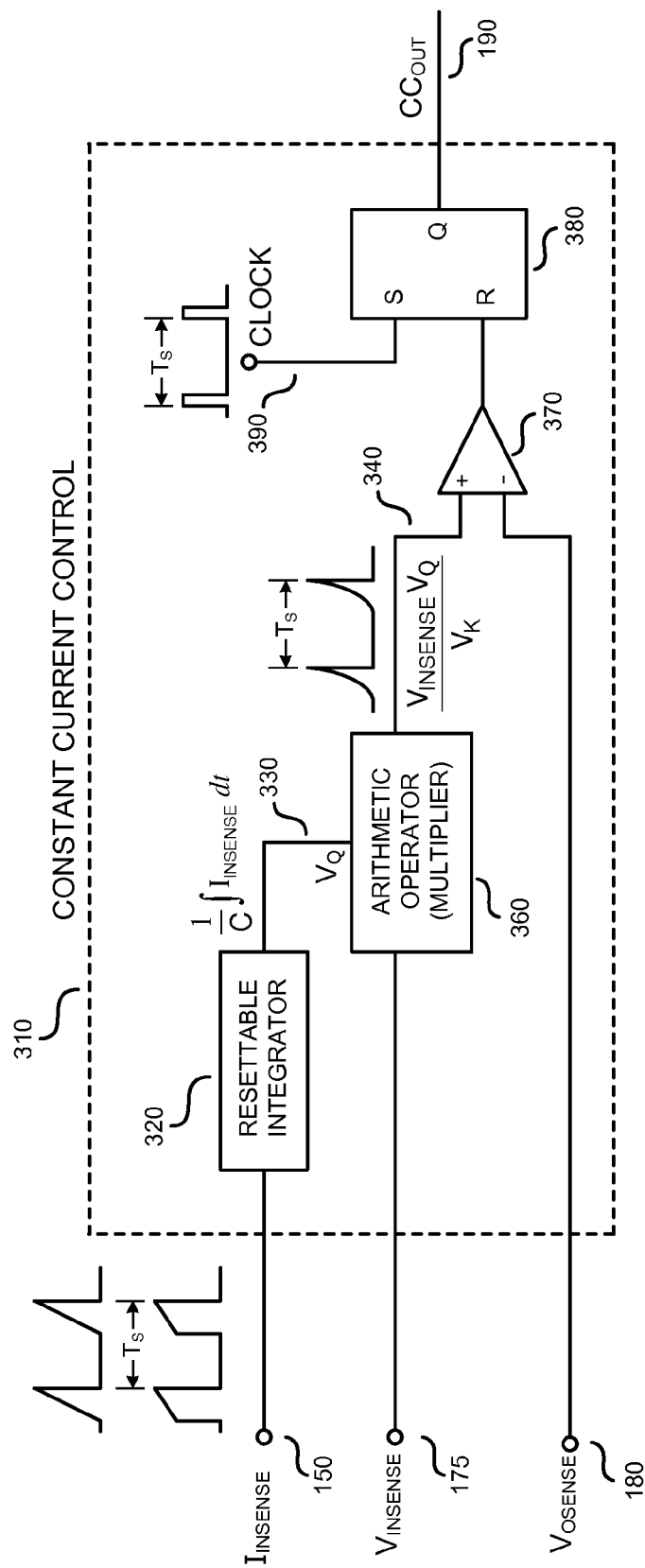
FIG. 3 is a functional block diagram that illustrates an example constant current control circuit, in accordance with the teachings of the present invention.

The relationship described by Equation (7) may be used in a control circuit in a number of ways to control a dc-dc converter that has an output with a region of constant current. FIG. 3 illustrates one example of a constant current control circuit 310 in accordance with the teaching of the invention. In the example constant current control circuit 310 of FIG. 3, a resettable integrator 320 integrates the input current sense signal $I_{INSENSE}$ 150 while the switch 120 in the dc-dc converter 115 is closed. Resettable integrator 320 produces an integrated signal $V_Q$ 330 that in one example is a voltage proportional to the charge taken from the source of input voltage $V_{IN}$ 105 during switching period $T_S$. Therefore, the integrated signal $V_Q$ 330 may be referred to as a charge signal. A multiplier 360 produces a multiplication signal 340 that is the product of the charge signal $V_Q$ 330 and the input voltage sense signal $V_{INSENSE}$ 175 scaled by the scaling voltage $V_K$.

In the example of FIG. 3, a clock signal 390 goes high to set a latch 380 at the beginning of a switching period $T_S$. An output of latch 380 is a control signal $CC_{OUT}$ 190 that goes high when latch 380 is set. Control signal $CC_{OUT}$ 190 goes low when latch 380 is reset. The output of a comparator 370 goes high to reset latch 380 to open switch 120 when the multiplication signal 340 becomes greater than the $V_{OSENSE}$ signal 180. In the example illustrated in FIG. 3, resettable integrator 320 is reset on the falling edge of control signal $CC_{OUT}$ 190. In other words, the constant current control circuit 310 in the example of FIG. 3 opens the switch 120 in switching period $T_S$ to satisfy the requirement of Equation (7) when Equation (7) is rearranged to have the output voltage sense signal $V_{OSENSE}$ 180 alone on one side as $$V_{OSENSE} = \frac{V_{INSENSE} V_Q}{V_K} \qquad \text{EQ. 9}$$

That is, constant current control circuit 310 generates control signal $CC_{OUT}$ 190 to control switching of switch 120 to regulate an output current of the power supply such that charge signal $V_Q$ 330 is proportional to a ratio of output voltage sense signal $V_{OSENSE}$ 180 to the input voltage sense signal $V_{INSENSE}$ 175.

Figure 4:
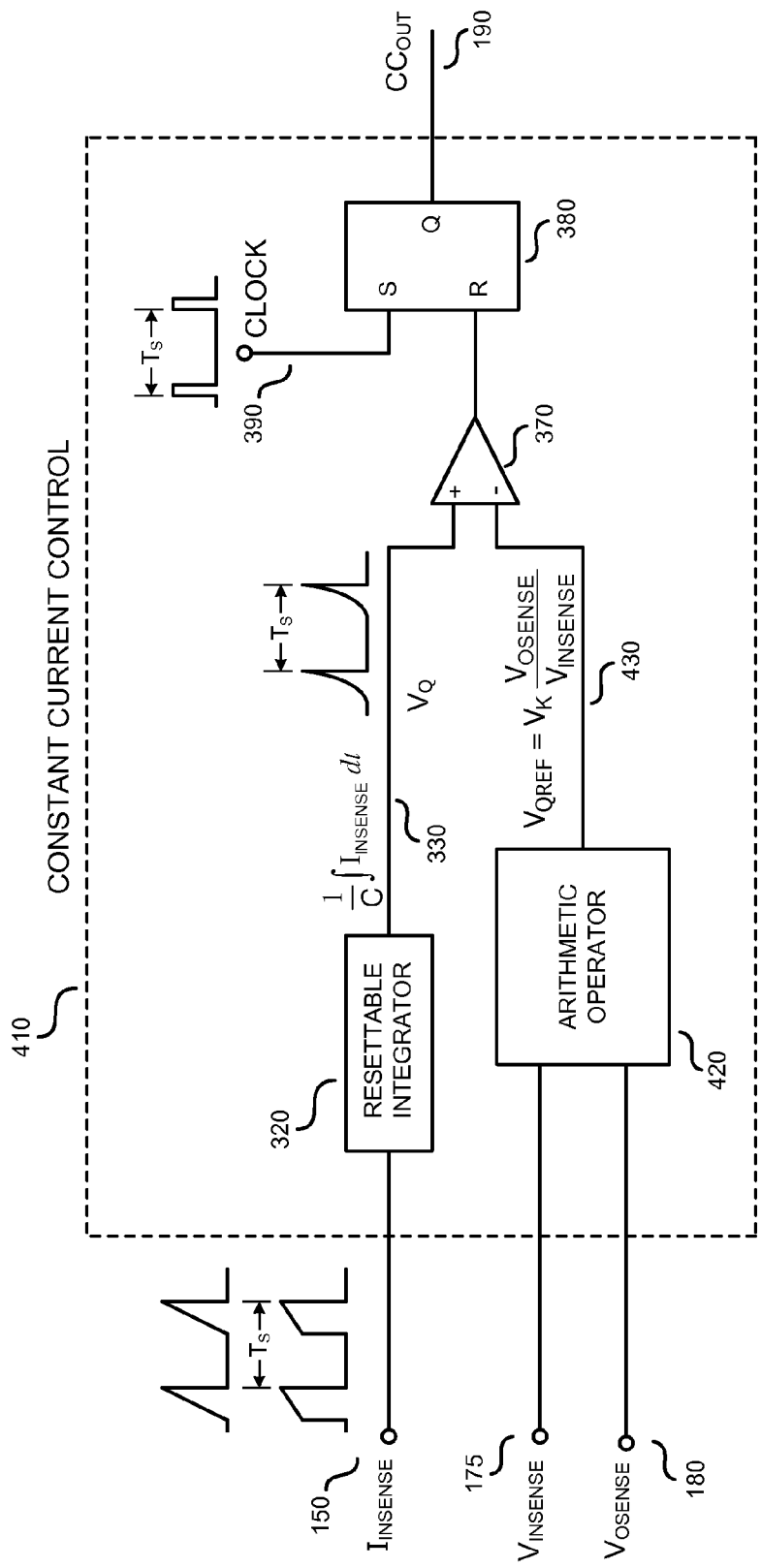
FIG. 4 is a functional block diagram that illustrates an alternative example constant current control circuit, in accordance with the teachings of the present invention.

The example circuit of FIG. 4 shows an alternative constant current control circuit 410 that produces the $CC_{OUT}$ signal in a different manner as the example controller of FIG. 3. The example constant current control circuit 410 includes an arithmetic operator circuit 420 that performs multiplication, division, and scaling of the input voltage sense signal $V_{INSENSE}$ 175 and the output voltage sense signal $V_{OSENSE}$ 180 that is scaled by the scaling voltage $V_K$. The output 430 of arithmetic operator circuit 420 is a reference signal $V_{QREF}$ that is equal to the term on the right-hand side of Equation (7)

$$V_{QREF} = \frac{V_{OSENSE}}{V_{INSENSE}} V_K \qquad \text{EQ. 10}$$

Thus, arithmetic operator 420 is coupled to divide the output voltage sense signal by the input voltage sense signal and to scale the result by a scaling factor $V_K$ to generate the reference signal $V_{QREF}$. In the example of FIG. 4, clock signal 390 goes high to set a latch 380 at the beginning of switching period $T_S$. An output of latch 380 is a control signal $CC_{OUT}$ 190 that goes high when latch 380 is set. Control signal $CC_{OUT}$ 190 goes low when latch 380 is reset. The output of comparator 370 goes high to reset latch 380 to open switch 120 when the charge signal $V_Q$ 330 becomes greater than the $V_{QREF}$ signal 430, which in the illustrated example is proportional to a ratio of the output voltage to the input voltage. Thus, constant current control circuit 410 generates control signal $CC_{OUT}$ 190 to control switching of switch 120 to regulate an output current of the power supply such that charge signal $V_Q$ 330 is proportional to a ratio of output voltage sense signal $V_{OSENSE}$ 180 to the input voltage sense signal $V_{INSENSE}$ 175.

The example resettable integrator 320 of FIGS. 3 and 4 may include a capacitor, a current source to charge the capacitor, and a switch to discharge the capacitor. In another example, resettable integrator 320 may be a two-way integrator. That is, resettable integrator 320 may integrate current sense signal $I_{INSENSE}$ 150 by charging a capacitor during one switching period $T_S$ and may then integrate current sense signal $I_{INSENSE}$ 150 by discharging the capacitor in a subsequent switching period. Such a two-way integrator may be useful in applications in which a high maximum duty ratio (e.g., 99%-100%) is desired for control signal $CC_{OUT}$ 190. An example resettable integrator circuit is discussed later in this disclosure.

Figure 5:
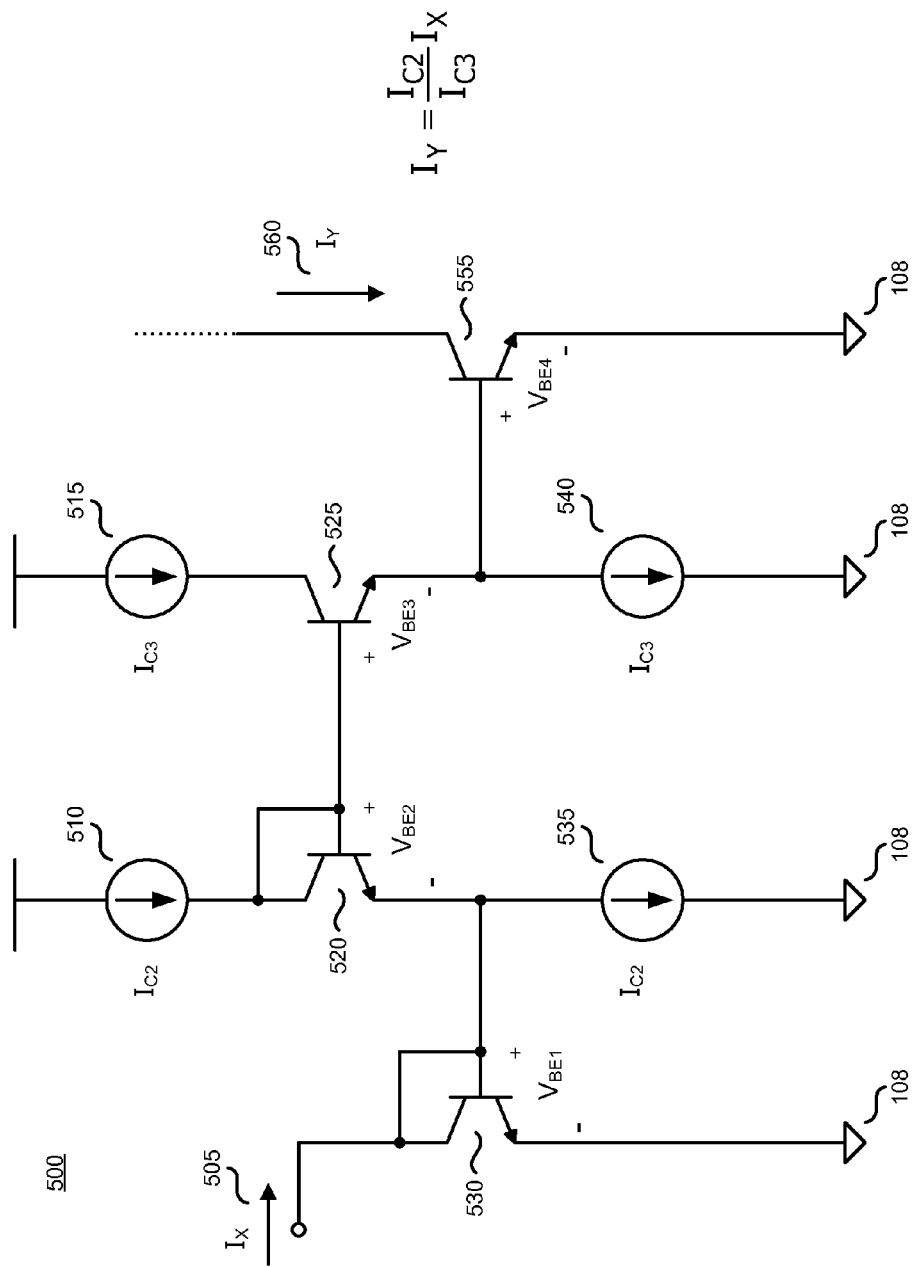
FIG. 5 is a schematic diagram illustrating an example arithmetic operator circuit, in accordance with the teachings of the present invention.

FIG. 5 shows an example circuit 500 that may perform the functions of the multiplier 360 of FIG. 3 and also the functions of the arithmetic operator 420 of FIG. 4 in accordance with the teaching of the invention. In the circuit of FIG. 5, bipolar NPN transistors 530, 520, 525, and 555 are matched. To a very good approximation, the base to emitter voltage of a bipolar transistor is directly proportional to the natural logarithm of the collector current. That is, for practical values in the region of interest, $$V_{BE} \approx V_T \ln\left(\frac{I_C}{I_S}\right) \qquad \text{EQ. 11}$$

where $V_{BE}$ is the base to emitter voltage, $V_T$ is the thermal voltage fixed by physical constants, $I_C$ is the collector current, and $I_S$ is the reverse saturation current of the base to emitter junction of the transistor.

For the circuit in FIG. 5, $$V_{BE1} + V_{BE2} = V_{BE3} + V_{BE4} \qquad \text{EQ. 12}$$

Therefore, under the condition that the base current of all transistors is negligible, the relationship of Equation (11) requires that the currents $I_X$ 505 and $I_Y$ 560 are related by the expression $$I_Y = \frac{I_{C2}}{I_{C3}} I_X \qquad \text{EQ. 13}$$

In other words, application of the logarithmic relationship of Equation (11) to the circuit of FIG. 5 shows that the input current $I_X$ 505 is multiplied by the value $I_{C2}$ of current sources 510 and 535. It can also be shown that the input current $I_X$ 505 is divided by the value $I_{C3}$ of the current sources 515 and 540. Therefore, multiplication of two signals may be achieved by the circuit in FIG. 5 when $I_X$ 505 is proportional to a first signal while current sources 510 and 535 are proportional to a second signal. Multiplication by the reciprocal of a third signal may be achieved when the current sources 515 and 540 are proportional to the third signal. Many suitable variants of the example circuit of FIG. 5 are known in the art.

In one example, current sources $I_{C2}$ 510 and 535 are constant with a value representative of the scaling voltage $V_K$, while current sources $I_{C3}$ 515 and 540 are variable current sources controlled by the input voltage sense signal $V_{INSENSE}$ 175. Thus, with input current $I_X$ directly proportional to the output voltage sense signal $V_{OSENSE}$ 180, output current $I_Y$ is representative of the reference signal $V_{QREF}$ 430, in accordance with Equation (10).

Figure 6:
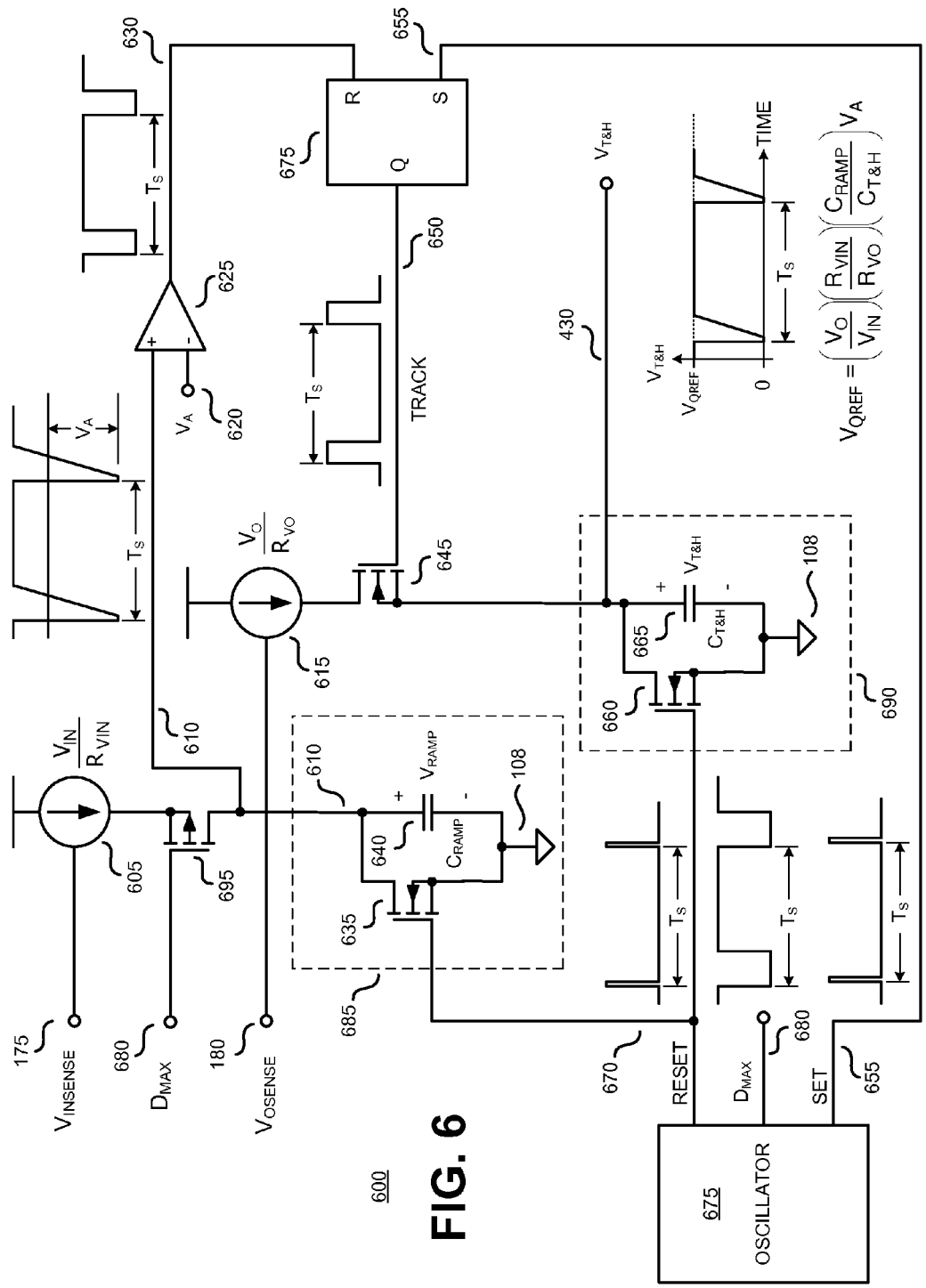
FIG. 6 is a schematic diagram illustrating an example arithmetic operator circuit, in accordance with the teachings of the present invention.

FIG. 6 is a schematic diagram 600 of another circuit that may provide the signal $V_{QREF}$ 430 in the constant current control circuit 410 of the example of FIG. 4. The example circuit of FIG. 6 has the desirable feature that it does not require matched bipolar transistors to achieve the desired accuracy in the result.

The example circuit of FIG. 6 uses the principle that the time required for a signal that is changing at a constant rate to go between two fixed values is inversely proportional to the rate of the change. Conversely, a signal changing at a constant rate for a fixed time will change by an amount that is directly proportional to the rate of change. It will be demonstrated next how the circuit of FIG. 6 uses time, rates of change, and fixed values to produce the reference signal $V_{QREF}$ 430 that is directly proportional to the output voltage $V_O$ 140 and is inversely proportional to the input voltage $V_{IN}$ 105.

Figure 7:
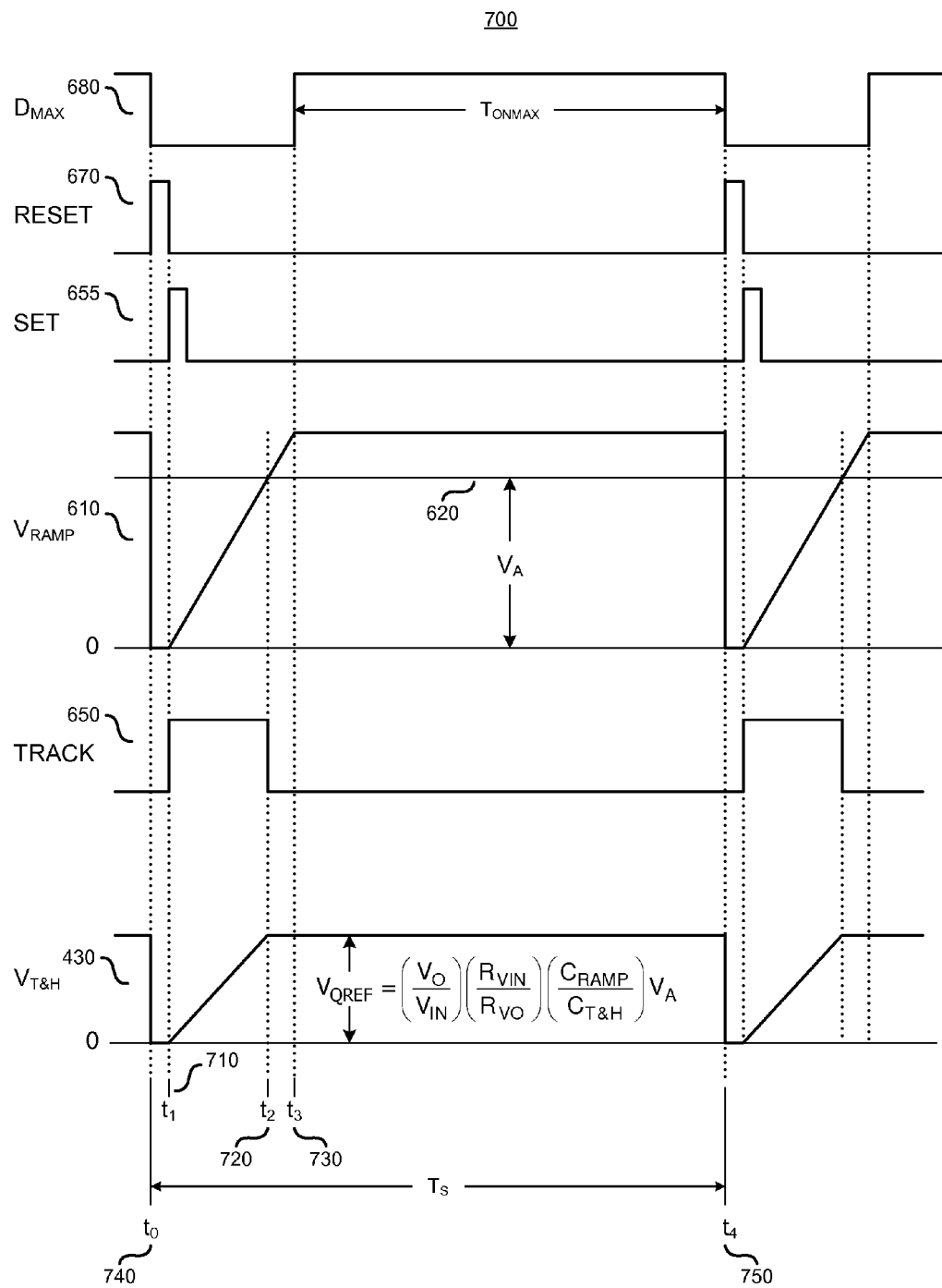
FIG. 7 is a timing diagram illustrating waveforms of signals from the arithmetic operator circuit of FIG. 6.

The example circuit of FIG. 6 includes an oscillator 675 that provides timing signals for the operation of the power supply. FIG. 7 is a timing diagram 700 of signals in the circuit 600. A convenient reference signal for timing purposes is the $D_{MAX}$ signal 680. $D_{MAX}$ signal 680 is low between time $t_0$ 740 and time $t_3$ 730. $D_{MAX}$ signal 680 is high between time $t_3$ 730 and time $t_4$ 750. Switch 120 may be closed when $D_{MAX}$ 680 is high. Switch 120 must be open when $D_{MAX}$ 680 is low. Therefore, $D_{MAX}$ is high for the maximum on-time $T_{ONMAX}$ of switch 120.

The example circuit of FIG. 6 includes a variable current source 605 that has a current directly proportional to input voltage $V_{IN}$ 105. The ratio of the input voltage $V_{IN}$ 105 to the current of current source 605 is the resistance $R_{VIN}$. Current source 605 is controlled by input voltage sense signal $V_{INSENSE}$ 175 in the example of FIG. 6.

The example circuit of FIG. 6 also includes a variable current source 615 that has a current directly proportional to output voltage $V_O$ 140. The ratio of the output voltage $V_O$ 140 to the current of current source 615 is the resistance $R_{VO}$. Current source 615 is controlled by output voltage sense signal $V_{OSENSE}$ 180 in the example of FIG. 6.

In the example circuit of FIG. 6 that is illustrated by the waveforms of FIG. 7, RESET signal 670 is high until a time $t_1$ 720 after $D_{MAX}$ 680 goes low. Resettable integrators 685 and 690 are reset when RESET signal 670 goes high. Although FIG. 7 illustrates capacitors $C_{RAMP}$ 640 and $C_{T\&H}$ 665 being reset to zero volts, in one example, capacitors $C_{RAMP}$ 640 and $C_{T\&H}$ 665 are reset to a non-zero voltage such that the charging from current sources 605 and 615, respectively, occurs in a linear operating range of capacitors $C_{RAMP}$ 640 and $C_{T\&H}$ 665. In the example circuit of FIG. 6, a SET signal 655 goes high on the falling edge of RESET signal 670. The rising edge of SET signal 655 sets flip-flop 675. When flip-flop 675 is set, the TRACK signal 650 at the output of flip-flop 675 goes high, allowing n-channel transistor 645 to conduct current from current source 615.

When $D_{MAX}$ 680 is low, p-channel transistor 695 conducts current from current source 605. When RESET signal 670 goes low at time $t_1$ 710, n-channel transistor 635 of resettable integrator 685 stops conducting to allow capacitor $C_{RAMP}$ 640 of resettable integrator 685 to charge from current source 605 through p-channel transistor 695. Also at time $t_1$ 710, n-channel transistor 660 of resettable integrator 690 stops conducting to allow track and hold capacitor $C_{T\&H}$ 665 to charge from current source 615 through n-channel transistor 645. The charging of capacitor $C_{T\&H}$ 665 produces a voltage $V_{T\&H}$ 430.

The charging of capacitor $C_{RAMP}$ 640 produces a voltage $V_{RAMP}$ 610 that is compared to an arbitrary reference voltage $V_A$ 620 by comparator 625. The voltage $V_{RAMP}$ 610 becomes greater than the voltage $V_A$ 620 at the time $t_2$ 720, causing the output 630 of comparator 625 to reset flip-flop 675. When flip-flop 675 is reset at time $t_2$ 720, TRACK signal 650 goes low to stop current source 615 from charging track and hold capacitor $C_{T\&H}$ 665.

When track and hold capacitor $C_{T\&H}$ 665 stops charging at time $t_2$ 720, the voltage $V_{T\&H}$ 430 has reached the required value for $V_{QREF}$ of Equation (10). Capacitor $C_{RAMP}$ 640 stops charging at time $t_3$ 730 when $D_{MAX}$ 680 goes high. Therefore, voltage $V_{T\&H}$ 430 is at the value $V_{QREF}$ from time $t_2$ 720 to time $t_4$ 750, and may be compared to the voltage $V_O$ 330 after switch 120 closes. For the example circuit of FIG. 6, the value of $V_{QREF}$ is $$V_{QREF} = \left(\frac{V_O}{V_{IN}}\right)\left(\frac{R_{VIN}}{R_{VO}}\right)\left(\frac{C_{RAMP}}{C_{T\&H}}\right)V_A \qquad \text{EQ. 14}$$

The values of $R_{VIN}$, $R_{VO}$, $C_{RAMP}$, $C_{T\&H}$, and $V_A$ may be selected to meet the requirement of Equation (7). Therefore, the example circuit 600 of FIG. 6 integrates two signals for a duration of time to provide a value $V_{QREF}$ within a switching period $T_S$ that is directly proportional to a value representative of output voltage $V_O$ 140 and is inversely proportional to a value representative of input voltage $V_{IN}$ 105.

Figure 8:
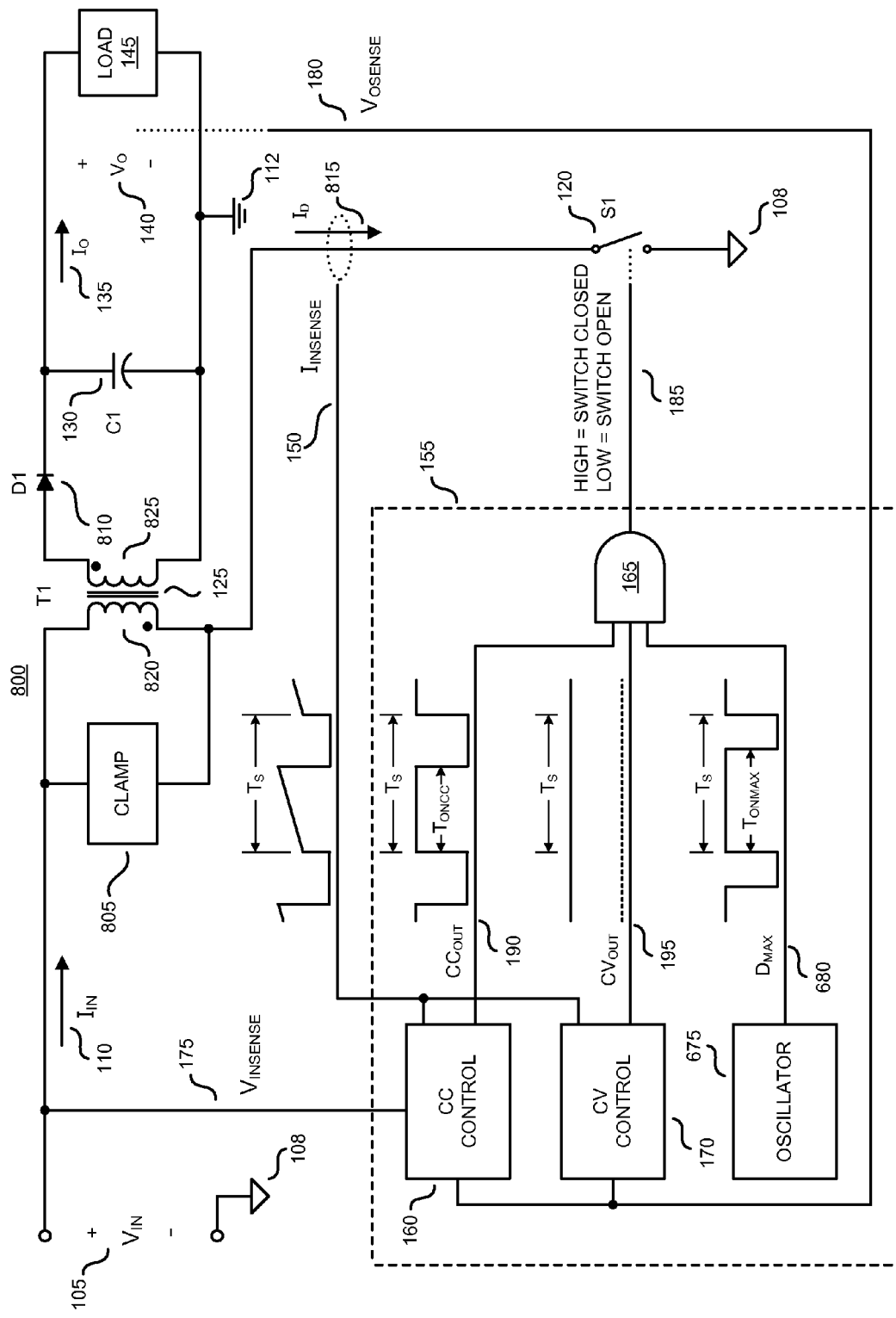
FIG. 8 is a functional block diagram illustrating an example flyback power supply that is operating in a region of regulated output current, in accordance with the teachings of the present invention.

FIG. 8 shows one example of a power supply 800 that includes a particular dc-dc converter known as a flyback converter. The example flyback converter of FIG. 8 includes an energy transfer element that is a coupled inductor T1 125, sometimes referred to as a transformer. Coupled inductor T1 125 has a primary winding 820 that is coupled to the source of input voltage $V_{IN}$ 105. Coupled inductor T1 125 has a secondary winding 825 that is coupled to the output return 112.

In the example power supply of FIG. 8, a switch S1 120 coupled to one end of primary winding 820 opens and closes in response to a drive signal 185 from controller 155. In one example, switch S1 120 may be a metal oxide semiconductor field effect transistor (MOSFET). In another example, switch S1 120 may be a bipolar junction transistor (BJT). In yet another example, switch S1 120 may be an insulated gate bipolar transistor (IGBT). A clamp circuit 805 is coupled across the primary winding 820 to limit the voltage across primary winding 820 when switch S1 120 opens.

In the example power supply of FIG. 8, controller 155 generates a drive signal 185 in response to an input voltage sense signal 175, an output voltage sense signal 180, and an input current sense signal 150. Input current sense signal 150 is representative of the value of current ID 815 in switch S1 120. In the example power supply of FIG. 8, the current ID 815 is the same as the input current $I_{IN}$ 110 when switch S1 120 is closed. Any of the several ways practiced in the art to sense current in a switch may provide the current sense signal 150. The waveform of the input current sense signal 150 in the example of FIG. 8 shows that the power supply is operating in continuous conduction mode.

In the example power supply of FIG. 8, the switching of switch S1 120 produces a pulsating current in secondary winding 825. The current in secondary winding 825 is rectified by diode D1 810 and filtered by capacitor C1 130 to produce a substantially dc output voltage $V_O$ 140 and an output current $I_O$ 135 to a load 145.

The example of FIG. 8 illustrates a power supply 800 that is operating in a region of regulated output current 220 as shown in the graph of FIG. 2. The output voltage $V_O$ 140 in the example of FIG. 8 is below the regulated value $V_{REG}$ 230. Therefore, constant voltage control circuit 170 produces an output $CV_{OUT}$ 195 that is always high. Oscillator 675 produces signal $D_{MAX}$ 680 that is high for time $T_{ONMAX}$, and constant current control circuit 160 produces a control signal $CC_{OUT}$ 190 that is high for a time $T_{ONCC}$ that is less than $T_{ONMAX}$. Logic circuit 165 is an AND gate that receives the signals $CC_{OUT}$ 190, $CV_{OUT}$ 195, and $D_{MAX}$ 680 in the example of FIG. 8 to produce the drive signal 185. Since all inputs to AND gate 165 must be high to produce a high output 185, switch S1 120 in the example power supply of FIG. 8 operates under the control of constant current control circuit 160.

Figure 9:
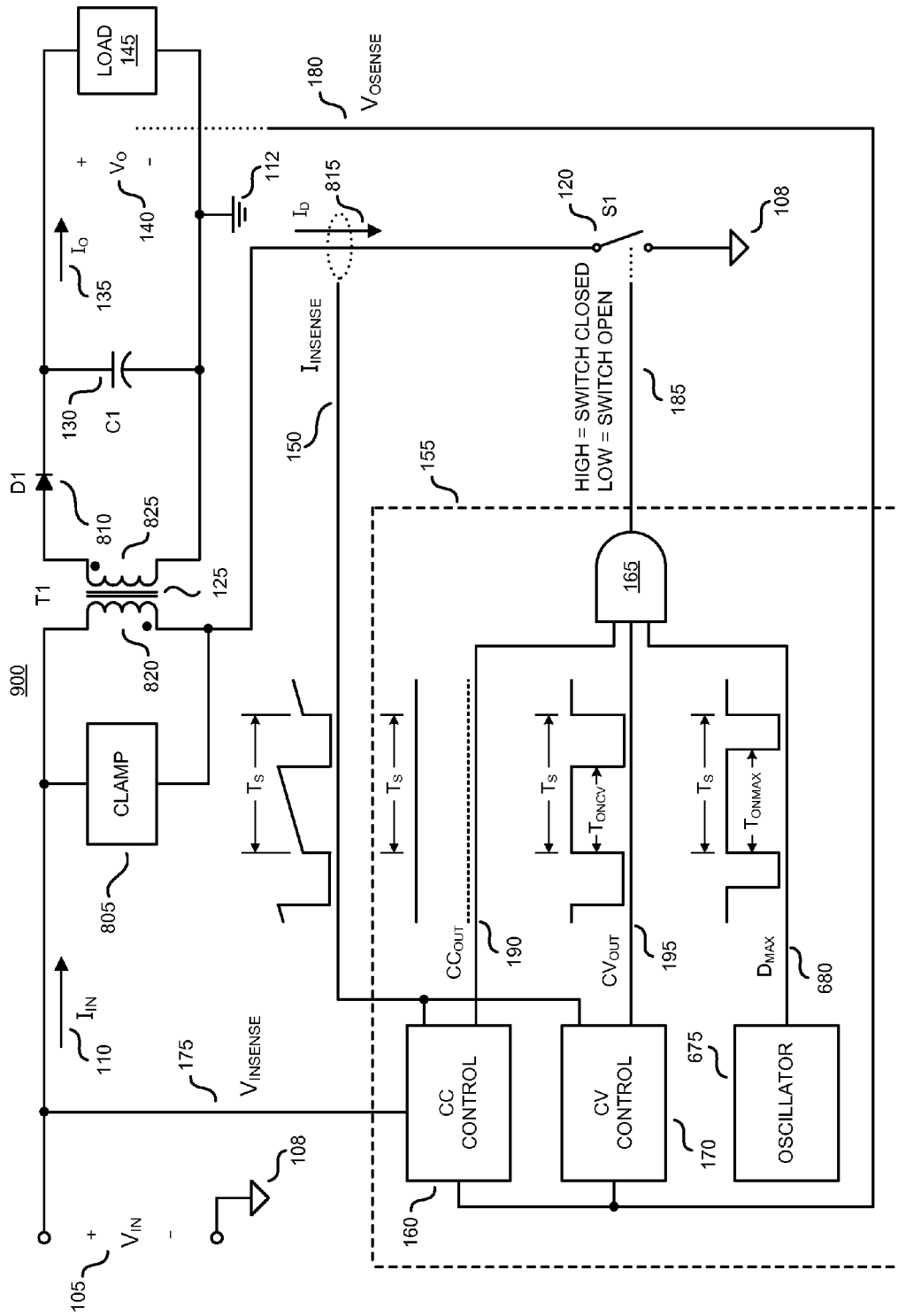
FIG. 9 is a functional block diagram illustrating an example flyback power supply that is operating in a region of regulated output voltage, in accordance with the teachings of the present invention.

The example of FIG. 9 illustrates a flyback power supply 900 that is operating in a region of regulated output voltage 210 as shown in the graph of FIG. 2. The output current $I_O$ 135 in the example of FIG. 9 is below the regulated value $I_{REG}$ 240. Therefore, constant current control circuit 160 produces an output signal $CC_{OUT}$ 190 that is always high. Oscillator 675 produces signal $D_{MAX}$ 680 that is high for a time $T_{ONMAX}$, and constant voltage control circuit 170 produces a signal $CV_{OUT}$ 195 that is high for a time $T_{ONCV}$ that is less than $T_{ONMAX}$. Since all inputs to AND gate 165 must be high to produce a high output 185, switch S1 120 in the example power supply of FIG. 9 operates under the control of constant voltage control circuit 170.

Figure 10:
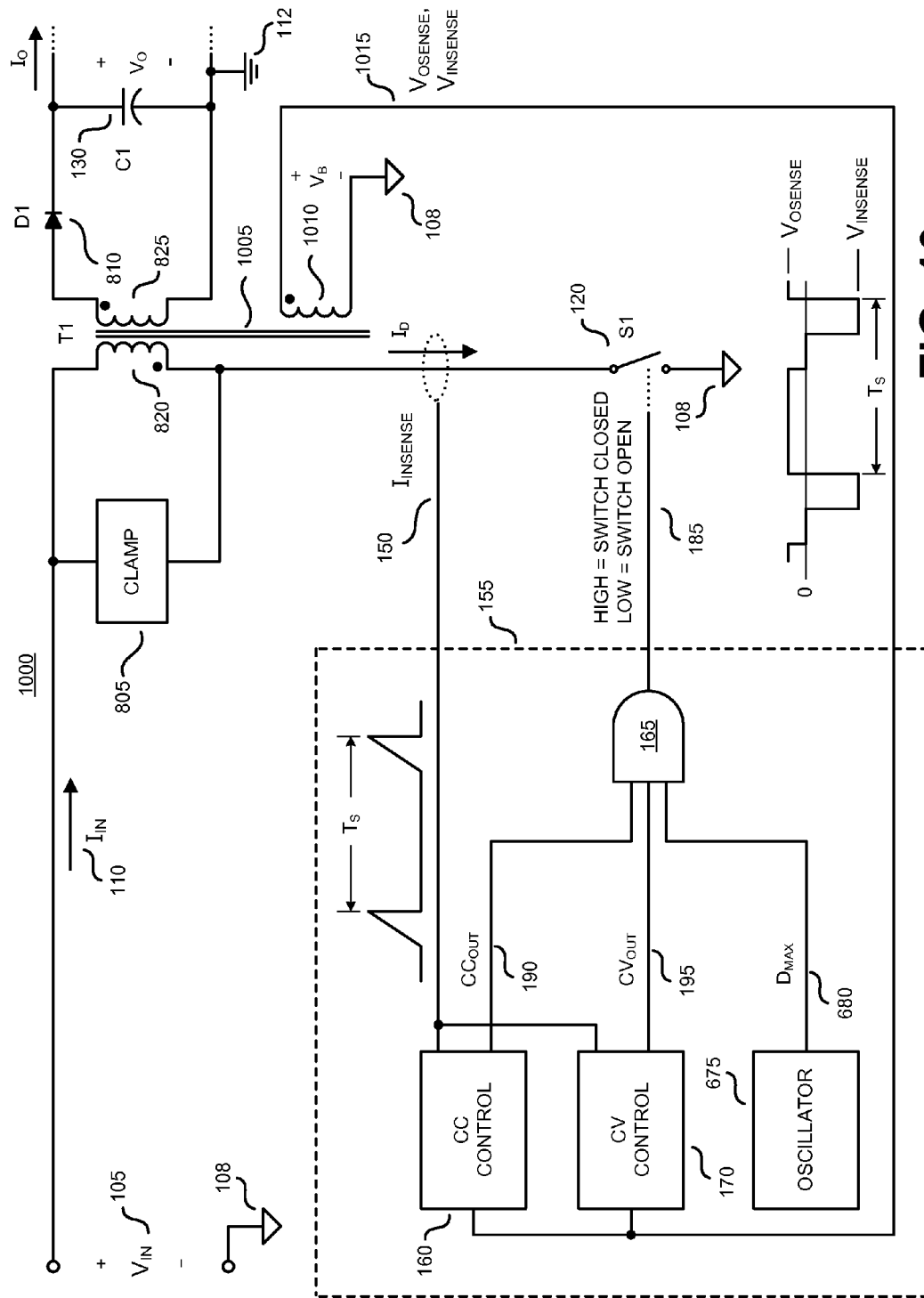
FIG. 10 is a functional block diagram illustrating an example flyback power supply with indirect sensing of input voltage and output voltage to provide an output with a regulated voltage region and a regulated current region.

FIG. 10 is an example of a flyback power supply 1000 that includes a coupled inductor T1 1005 that has three windings. Coupled inductor T1 1005 includes a winding 1010 that provides a voltage $V_B$. In one example, the voltage $V_B$ on winding 1010 is an ac voltage with an average voltage of zero. In one example, a positive voltage on winding 1010 with respect to the input return 108 is representative of the output voltage $V_O$ 140, and a negative voltage on winding 1010 with respect to the input return 108 is representative of the input voltage $V_{IN}$ 105. Therefore, a signal 1015 from winding 1010 may combine an input voltage sense signal $V_{INSENSE}$ 175 and an output voltage sense signal $V_{OSENSE}$ 180. The combined voltage sense signal 1015 may be received by a controller 155. The example of FIG. 10 shows waveforms of the input current sense signal $I_{INSENSE}$ 150 and the combined voltage sense signal 1015 that indicate the example power supply is operating in discontinuous conduction mode. It is appreciated that the power supply 1000 of FIG. 10 may operate in continuous conduction mode when input voltage $V_{IN}$ 105 decreases or when output current $I_O$ 135 increases.

Figure 11:
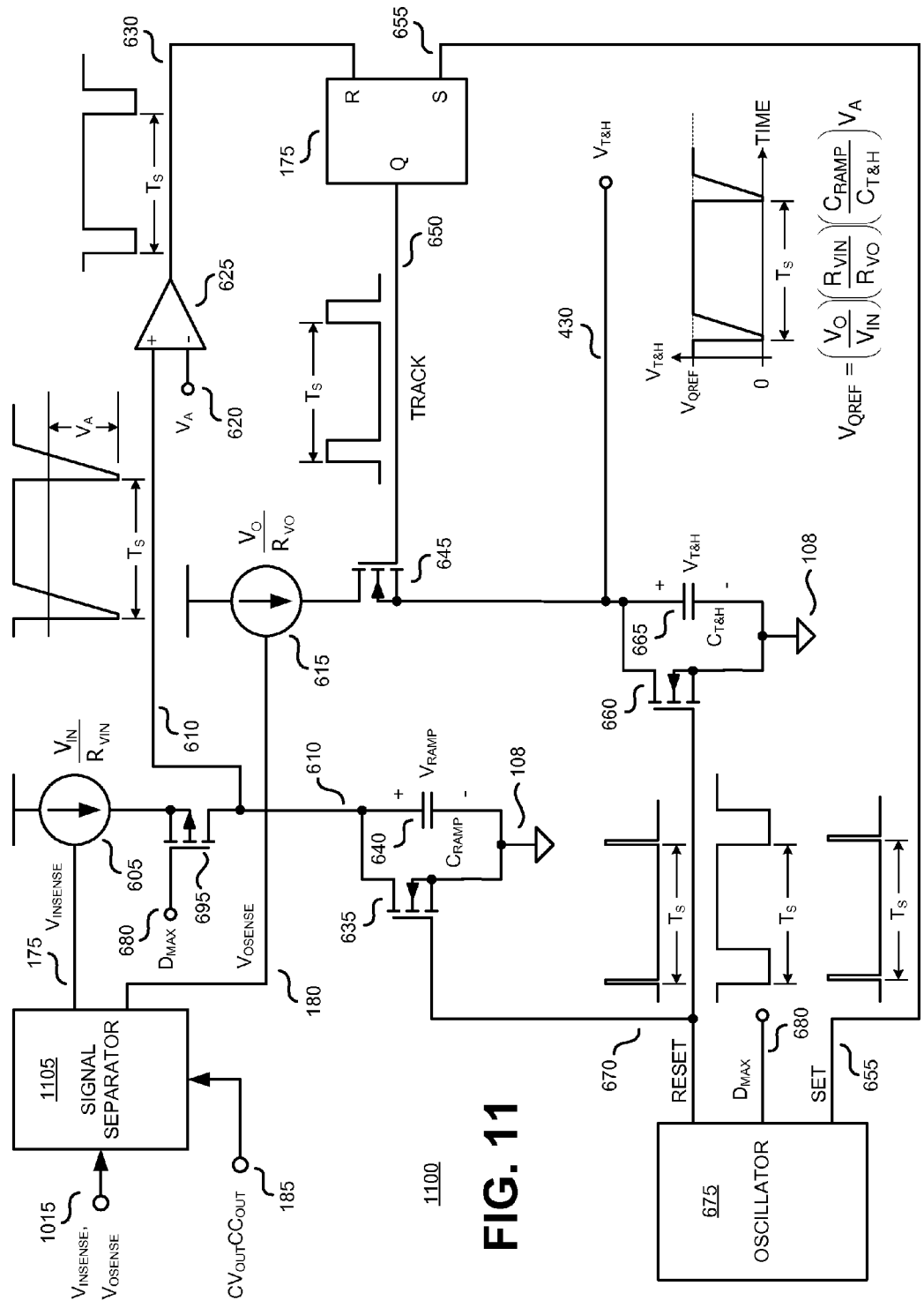
FIG. 11 is a schematic diagram illustrating an alternative example arithmetic operator circuit, in accordance with the teachings of the present invention.

FIG. 11 shows an example schematic 1100 that includes an addition to the example circuit 600 of FIG. 6 for use with the combined voltage sense signal 1015 of the example power supply of FIG. 10. The example of FIG. 11 includes a signal separator circuit 1105 that extracts the $V_{INSENSE}$ signal 175 and the $V_{OSENSE}$ signal 180 from the combined voltage sense signal 1015. In one example, signal separator circuit 1105 rectifies the combined voltage sense signal 1015. In one example, the rectified signal is sampled and held to produce $V_{INSENSE}$ 175 when $CV_{OUT}CC_{OUT}$ 185 goes high, and the rectified signal is sampled and held to produce $V_{OSENSE}$ 180 when $CV_{OUT}CC_{OUT}$ goes low.

Figure 12:
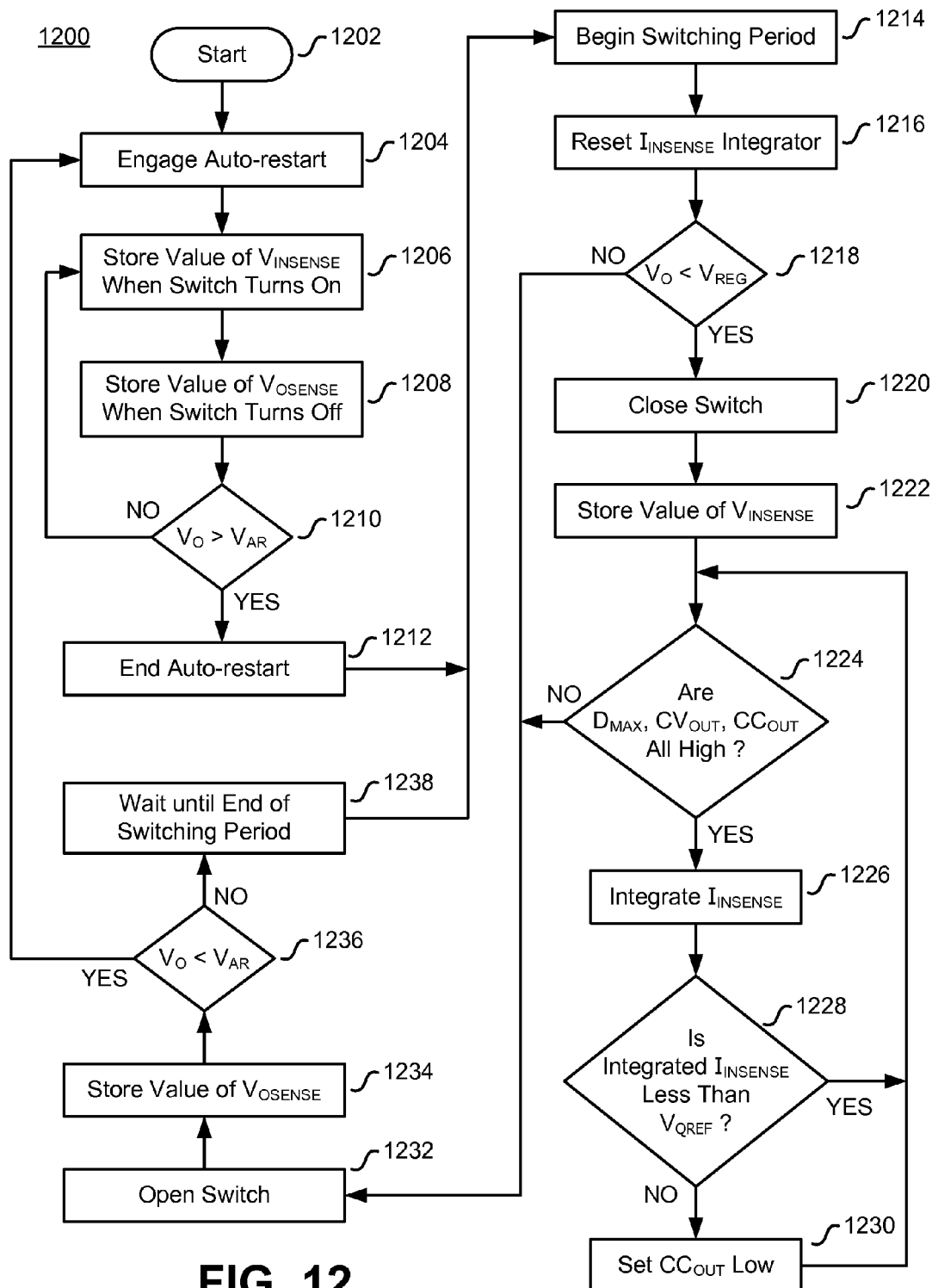
FIG. 12 is a flow diagram illustrating a method to control a power supply that provides an output with a regulated voltage region and a regulated current region, in accordance with the teachings of the present invention.

FIG. 12 is a flowchart 1200 that describes a method to control the example power supply of FIG. 10 that has an output with a region of regulated voltage and a region of regulated current according to the teaching of the invention.

After starting in step 1202 with an output voltage of zero and no output current, auto-restart operation is engaged in step 1204. While in the auto-restart mode, step 1206 stores the value of $V_{INSENSE}$ when the switch S1 120 is closed, and step 1208 stores the value of $V_{OSENSE}$ when switch S1 120 is open.

Step 1210 compares output voltage $V_O$ 140 to the auto-restart threshold voltage $V_{AR}$ 260. If output voltage $V_O$ 140 is greater than the auto-restart threshold voltage $V_{AR}$ 260, then auto-restart ends in step 1212. If output voltage $V_O$ 140 is not greater than the auto-restart threshold voltage $V_{AR}$ 260, then auto-restart continues in step 1206.

After the end of auto-restart in step 1212, a new switching period begins in step 1214. The integrator of input current sense signal $I_{INSENSE}$ 150 is reset to an initial value in step 1216. Step 1218 compares output voltage $V_O$ 140 to the regulated value $V_{REG}$ 230. If output voltage $V_O$ 140 is less than the regulated value $V_{REG}$ 230, then switch S1 120 closes in step 1220. If output voltage $V_O$ 140 is not less than the regulated value $V_{REG}$ 230, then switch S1 120 remains open in step 1232, the value of $V_{OSENSE}$ 180 is stored in step 1234, and output voltage $V_O$ 140 is compared to the auto-restart threshold voltage $V_{AR}$ 260 in step 1236.

If output voltage $V_O$ 140 is less than the auto-restart threshold voltage $V_{AR}$ 260 in step 1236, then the flow returns to step 1204 to engage auto-restart. If output voltage $V_O$ 140 is not less than the auto-restart threshold voltage $V_{AR}$ 260 in step 1236, then the controller waits for the end of the switching period in step 1238 before another switching period begins in step 1214.

After switch S1 120 closes in step 1220, step 1222 stores the value of $V_{INSENSE}$ 175. The collective status of the signals $D_{MAX}$ 680, $CV_{OUT}$ 195, and $CC_{OUT}$ 190 is then evaluated in step 1224. If $D_{MAX}$ 680, $CV_{OUT}$ 195, and $CC_{OUT}$ 190 are all at a logic high level, then the integration of input current sense signal $I_{INSENSE}$ 150 begins in step 1226. If any of the signals $D_{MAX}$ 680, $CV_{OUT}$ 195, and $CC_{OUT}$ 190 are at a logic low level, then switch S1 120 opens in step 1232.

After the integration of input current sense signal $I_{INSENSE}$ 150 begins in 1226, the result of the integration $V_Q$ 330 is compared to the reference value $V_{QREF}$ 430 in step 1228. If $V_Q$ 330 is less than $V_{QREF}$ 430, then the flow returns to step 1224. If $V_Q$ 330 is not less than $V_{QREF}$ 430, then $CC_{OUT}$ 190 is set to a logic low level in step 1230 before the flow returns to step 1224.

The order in which some or all of the process blocks appear in flow diagram 1200 should not be deemed limiting. Rather, one of ordinary skill in the art having the benefit of the present disclosure will understand that some of the process blocks may be executed in a variety of orders not illustrated.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power supply, comprising:
an energy transfer element coupled between an input voltage source and an output of the power supply;
a switch coupled to the energy transfer element, wherein the switch opens and closes in response to a drive signal; and
a controller coupled to the switch to control switching of the switch to regulate an output current of the power supply, wherein the controller includes:
a logic circuit coupled to generate the drive signal in response to a control signal;
a constant current control circuit coupled to the logic circuit and coupled to generate the control signal in response to a received input current sense signal, input voltage sense signal, and output voltage sense signal; and
an integrator included in the constant current control circuit, wherein the integrator is adapted to integrate the input current sense signal during a switching period of the control signal to generate an integrated signal representative of a charge taken from the input voltage source, wherein the constant current control circuit is adapted to generate the control signal such that the integrated signal is proportional to a ratio of the output voltage sense signal to the input voltage sense signal.

2. The power supply of claim 1, wherein the control signal is a first control signal, the controller further comprising a constant voltage control circuit to generate a second control signal in response to the output voltage sense signal to control switching of the switch to regulate an output voltage of the power supply.

3. The power supply of claim 2, wherein the logic circuit is coupled to the constant voltage control circuit to control switching of the switch in response to the second control signal to regulate the output voltage of the power supply when the output current is less than a threshold current and wherein the logic circuit is coupled to the constant current control circuit to control switching of the switch in response to the first control signal to regulate the output current when the output voltage is less than a threshold voltage.

4. The power supply of claim 3, wherein the controller further comprises an oscillator to generate a maximum duty cycle signal, wherein a first input of the logic circuit is coupled to receive the first control signal, a second input of the logic circuit is coupled to receive the second control signal, and a third input of the logic circuit is coupled to receive the maximum duty cycle signal.

5. The power supply of claim 3, wherein output voltage is regulated to the threshold voltage when regulating the output voltage and wherein the output current is regulated to the threshold current when regulating the output current.

6. The power supply of claim 1, wherein the controller switches the switch from an ON state to an OFF state in response to the integrated signal reaching a value that is proportional to the ratio of the output voltage sense signal to the input voltage sense signal.

7. The power supply of claim 1, wherein the constant current control circuit further comprises an arithmetic operator circuit coupled to multiply, divide or scale the input voltage sense signal.

8. The power supply of claim 7, wherein the arithmetic operator circuit is coupled to divide the output voltage sense signal by the input voltage sense signal to generate a reference signal, the constant current control circuit further comprising a comparator having a first input coupled to receive the reference signal, a second input coupled to receive the integrated signal, and an output coupled to output the control signal.

9. The power supply of claim 7, wherein the arithmetic operator circuit is coupled to multiply the input voltage sense signal by the integrated signal to generate a multiplication signal, the constant current control circuit further comprising a comparator having a first input coupled to receive the multiplication signal, a second input coupled to receive the output voltage sense signal, and an output coupled to output the control signal.

10. The power supply of claim 1, wherein the controller further comprises:
a first variable current source controlled by the input voltage sense signal to generate a first current;
a first integrator coupled to integrate the first current to generate a voltage ramp signal;
a second variable current source controlled by the output voltage sense signal to generate a second current; and
a second integrator coupled to integrate the second current when the switch is in an OFF state to provide a track and hold voltage, wherein the track and hold voltage is proportional to a ratio of the output voltage sense signal to the input voltage sense signal at a time that the voltage ramp signal reaches a reference voltage; and
a comparator having a first input coupled to receive the track and hold voltage, a second input coupled to receive the integrated signal, and an output coupled to output the control signal.

11. The power supply of claim 1, wherein the controller further comprises:
an input terminal to be coupled to receive a combined voltage sense signal representative of the input voltage and the output voltage of the power supply; and
a signal separator coupled between the input terminal and the constant current control circuit to separate the combined voltage sense signal into the input voltage sense signal and the output voltage sense signal.

12. The power supply of claim 1, wherein the switch and the constant current control circuit are integrated into a single monolithic integrated device.

13. A power supply, comprising:
an energy transfer element coupled between an input voltage source and an output of the power supply;
a switch coupled to the energy transfer element, wherein the switch opens and closes in response to a drive signal; and
a controller coupled to the switch to control switching of the switch to regulate an output current of the power supply, wherein the controller includes:
a logic circuit coupled to generate the drive signal in response to a control signal;
a constant current control circuit coupled to the logic circuit and coupled to generate the control signal in response to a received input current sense signal, input voltage sense signal, and output voltage sense signal;
an integrator included in the constant current control circuit, wherein the integrator is adapted to integrate the input current sense signal during a switching period of the control signal to generate an integrated signal representative of a charge taken from an input voltage source of the power supply;
an arithmetic operator circuit coupled to generate a reference signal that is proportional to a ratio of the output voltage sense signal to the input voltage sense signal; and
a comparator having a first input coupled to receive the integrated signal, a second input coupled to receive the reference signal, and an output coupled to turn the switch to an OFF state in response to the integrated signal reaching a value of the reference signal.

14. The power supply of claim 13, wherein the controller further comprises a constant voltage control circuit to control switching of the switch to regulate an output voltage of the power supply in response to the output voltage sense signal.

15. The power supply of claim 14, wherein the logic circuit is coupled to the constant voltage control circuit to control switching of the switch to regulate the output voltage of the power supply when the output current is less than a threshold current and wherein the logic circuit is coupled to the constant current control circuit to control switching of the switch to regulate the output current when the output voltage is less than a threshold voltage.

16. The power supply of claim 15, wherein the controller further comprises an oscillator to generate a maximum duty cycle signal, wherein a first input of the logic circuit is coupled to the constant current control circuit, a second input of the logic circuit is coupled to the constant voltage control circuit, and a third input of the logic circuit is coupled to receive the maximum duty cycle signal.

17. The power supply of claim 15, wherein output voltage is regulated to the threshold voltage when regulating the output voltage and wherein the output current is regulated to the threshold current when regulating the output current.

18. The power supply of claim 13, wherein the arithmetic operator circuit is coupled to divide the output voltage sense signal by the input voltage sense signal to generate the reference signal.

19. The power supply of claim 13, wherein the arithmetic operator includes:
a first variable current source controlled by the input voltage sense signal to generate a first current;
a first integrator coupled to integrate the first current to generate a voltage ramp signal;
a second variable current source controlled by the output voltage sense signal to generate a second current; and
a second integrator coupled to integrate the second current when the switch is in an OFF state to provide the reference signal, wherein the reference signal is proportional to the ratio of the output voltage sense signal to the input voltage sense signal at a time that the voltage ramp signal reaches a reference voltage.

20. The power supply of claim 13, wherein the switch and the constant current control circuit are integrated into a single monolithic integrated device.

* * * * *